June 9, 1936. D. P. KING 2,043,801
CARBURETOR
Filed July 19, 1935
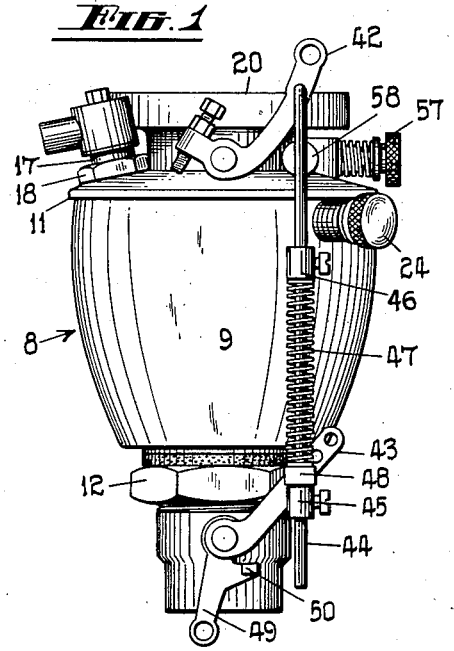
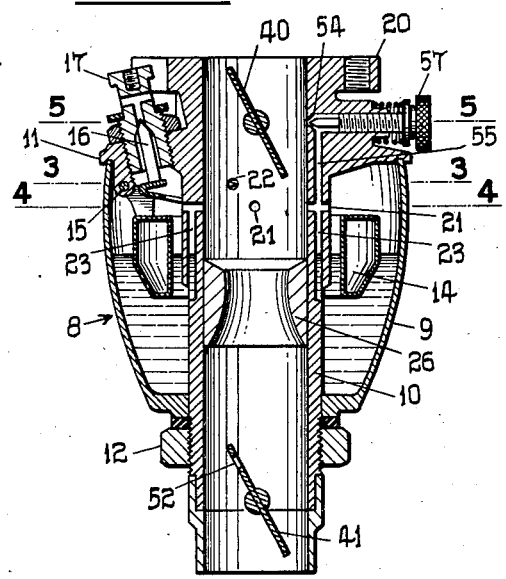
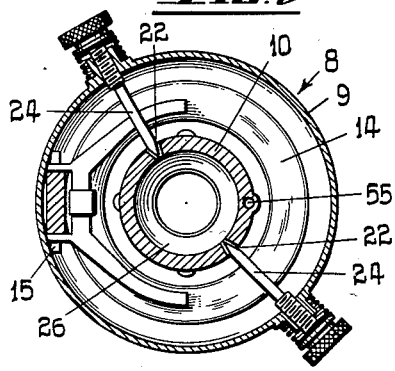
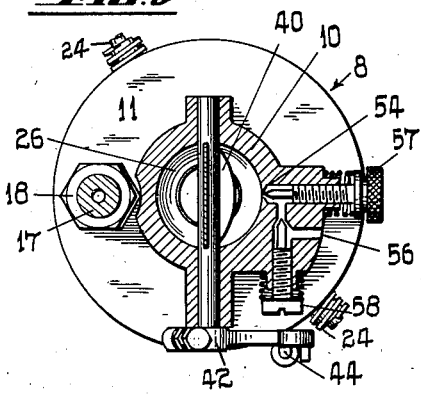
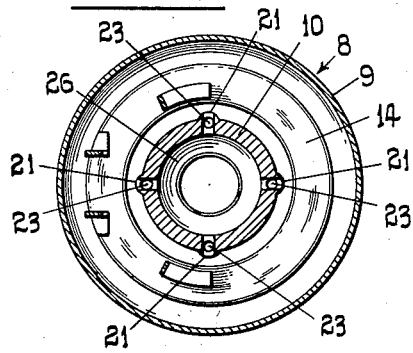
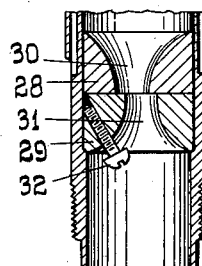
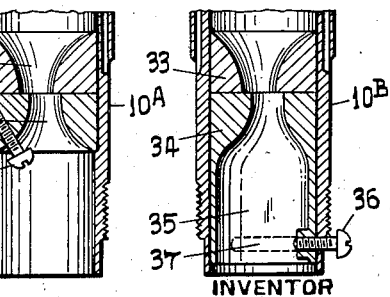
INVENTOR
Daniel Pottle King
BY Munn & Co.
ATTORNEYS Patented June 9, 1936

2,043,801

UNITED STATES PATENT OFFICE 2,043,801

CARBURETOR

Daniel Pottle King, Goodwood, Australia

Application July 19, 1935, Serial No. 32,293
In Australia July 25, 1934

11 Claims. (Cl. 261—41)

This invention relates to an improved carburetor for internal combustion engines using a liquid fuel such for instance as petrol, the object of the invention being to increase the effectiveness of carburation and to simplify the construction of the mechanism.

According to my invention the carburetor comprises a chamber in which a constant level of liquid fuel is adapted to be maintained, the chamber having associated with it a main air intake duct which, in use, is a continuation of the induction pipe of the engine, the duct having suitably positioned perforations through it communicating with the space within the chamber above the level of the fuel.

The perforations through the duct are arranged at different heights relative to the fuel level and those nearest the fuel level are provided with channels connecting them with the fuel space so that they act to spray fuel when there is an air or vapour flow through such perforations.

The air intake duct is provided with means to regulate the pressures within the duct and over the perforations and these means are preferably in the form of a throttle valve near the induction pipe end of the duct and a control valve near the intake end of the duct, the two valves being preferably interconnected to operate in unison but not necessarily in the same ratios or with the same setting. A Venturi restriction is positioned within the duct to circulate air through the perforations and consequently through the chamber when there is an air flow through the duct.

In order that my invention may be the more clearly understood I will now describe the preferred embodiment of same with reference to the accompanying drawing in which:

Fig. 1 is an outside view of my invention.
Fig. 2 is a vertical central section of same.
Fig. 3 is a cross-section as on line 3—3 of Fig. 2.
Fig. 4 is a cross-section as on line 4—4 of Fig. 2.
Fig. 5 is a cross-section as on line 5—5 of Fig. 2.
Fig. 6 is a central vertical section of portion of an air intake duct showing a venturi in which the effective diameter may be varied, and
Fig. 7 is a view similar to Fig. 6 but showing a further modification of the venturi.

The carburetor comprises an annular float chamber 8 consisting of a bowl-shaped portion 9 surrounding a tubular duct 10 and confined thereon between an annular flange 11 integral with the tubular duct 10 and a nut 12 engaging a screw thread formed upon the tubular duct 10.

The chamber 8 has within it a float 14 connected by a pivot pin 15 to the flange 11, the float operating a needle valve 16 positioned in the fuel inlet 17 to the float chamber 8. The fuel inlet 17 is in the form of a threaded tube and may consequently be adjusted in position to vary the height of the liquid level within the float chamber. A lock nut 18 normally prevents rotation of the fuel inlet 17.

The tubular duct 10 has at its top a flange 20 for attachment to the flange of the induction pipe of the engine.

Communication is given between the inside of the tubular duct 10 and the inside of the float chamber 8 by two rows of perforations 21 and 22 positioned somewhat above the fuel level in the float chamber. The lower row of which I term airjet perforations, have communicating with them channels 23 which open into the float chamber 8 somewhat below the fuel level. The upper perforations 22 are provided with needle valves 24 adjustment of which controls the effective opening of such perforations.

Within the tubular duct 10 just below the row of airjet perforations 21 is a sleeve 26 shaped to give to the inside of the duct a Venturi conformation. This sleeve 26 is preferably made adjustable in the duct 10 to enable it to be positioned nearer to or further from the row of perforations the adjustment being effected by forcing the sleeve, which is tightly fitted into the duct 10, in the required direction.

To enable the effective diameter of the venturi to be changed the sleeve may be made in two parts 28 and 29 as shown in Fig. 6, the one part 28 being fixed in the tubular duct 10A and the other part 29 being rotatable therein. The parts 28 and 29 have through them eccentric perforations 30 and 31 respectively, and the part 29 is normally locked against rotation by a set screw 32.

In the modification shown in Fig. 7 the sleeve is again in two parts 33 and 34, the part 33 being fixed and the part 34 being rotatable, but the part 34 is formed with an extension 35 in which is a set screw 36, the set screw passing through a slot 37 in the tubular duct 10B. By this arrangement the adjustment of the effective diameter can be carried out while the engine is running, it being only necessary to move the set screw 36 in the slot 37.

The upper portion of the duct 10 has in it a throttle valve 40 of usual or approved construction, and the lower portion of the duct has within it a control valve 41. The valves have operating arms 42 and 43 respectively. The arms 42 and 43 of the two valves are operatively interconnected by a rod 44 to normally move in unison but the connection is such that the lower arm may be set to a different angular relationship, the means for adjusting the angular relationship comprising two adjustable collars 45 and 46 and a spring 47 all encircling the rod 44, the rod 44 passing through a perforation in a stud 48 upon the arm 43, the collar 45 being upon one side of the stud 48, and the spring 47 and collar 46 being upon the other side of the stud 48.

The purpose of the spring 47 is to allow the control valve 41 to be closed independently of the throttle valve 40, to cause it to act as a choke, closure being effected by moving the arm 49 which is loosely mounted upon the shaft of the valve 41 and which has a finger 50 adapted to contact with the arm 43.

To permit an air flow to enable the idler jet to function the control valve 41 may have small perforations 52 through it, but the same result may be achieved by suitably positioning the valve 41 relative to the throttle valve 40.

The idler jet 54 opens into the tubular duct 10 just above the throttle valve 40, a duct 55 connecting it with the liquid fuel in the float chamber 8. The jet 54 has an air supply duct 56, and the idler jet 54 and the air supply duct 56 are provided with needle valves 57 and 58 respectively.

In operation as air is drawn through the duct 10 by the suction of the engine a lower pressure is obtained in the duct, the pressure being given the correct value by an initial adjustment of the position of the control valve 41 relative to that of the throttle valve 40. The suction and air circulation causes vapour to be drawn off from the liquid fuel in the float chamber, the air and vapour flowing through the perforations in the duct and mingling with the air in the duct forms an explosible mixture which is drawn into the engine. The flow of air through the airjet perforations causes fuel to be drawn up the channels connecting with such perforations and a spray of finely divided fuel mixed with the air or vapour-laden air is the result. The spray action becomes more energetic as the air velocity through the carburetor increases, the venturi then causing greater circulation through the chamber. At low speeds the pulsations of the air due to the uneven cylinder suction and the shocks due to the inlet valves closing may cause an air jet action in both directions through the air jet perforations and this increases vapourization by spraying fuel against the wall of the chamber.

What I claim is:

1. An improved carburetor comprising; a chamber having a fuel inlet and means to control the level of the fuel therein, an air intake duct associated with the chamber, small airjet perforations through the duct communicating with the chamber above the fuel level therein, channels leading from the fuel space and opening into the perforations through the walls thereof, perforations through the duct into the chamber further from the fuel level than the aforesaid airjet perforations, and means to regulate pressures within the duct to cause an airflow through the perforations.

2. Means according to claim 1 further characterized by a control valve near the air intake end of the duct, a throttle valve near the other end of the duct, and a venturi in the duct positioned adjacent the airjet perforations on the control valve side thereof.

3. Means according to claim 1 characterized by a control valve near the air intake end of the duct, a throttle valve near the other end of the duct, and a venturi in the duct comprising a fixed part and a movable part each part having an eccentric opening through it, the venturi being positioned adjacent the airjet perforations on the control valve side thereof.

4. An improved carburetor comprising: a chamber having a float-controlled fuel inlet, an air intake duct associated with the chamber one end of which is adapted to be connected to the induction pipe of an engine, differently positioned perforations through the duct to give communication between the inside of the duct and the space in the chamber above the fuel level, channels leading from the perforations nearest the fuel level in the chamber to somewhat below the fuel level, a throttle valve near the induction pipe end of the duct, a control valve near the intake end of the duct, and means to cause the valves to be operated in unison.

5. Means according to claim 4 characterized by a Venturi restriction in the duct between the perforations next the control valve and the control valve.

6. An improved carburetor as set forth in claim 4 characterized in that the means which cause the valves to move in unison comprises: a rod pivoted to an arm upon the throttle valve, a stud pivoted upon an arm upon the control valve, the rod being slidable through the stud, a movable collar positioned upon the rod on one side of the stud, a spring and a movable collar upon the rod on the other side of the stud, and an arm loosely mounted upon the shaft of the control valve and having a finger adapted to contact with the arm of the control valve.

7. An improved carburetor comprising: a chamber provided with a fuel inlet and a float control, an air intake duct associated with the chamber one end of which is adapted to be connected to the induction pipe of an engine, airjet perforations through the duct communicating with the chamber slightly above the fuel level, further perforations at a greater distance from the fuel level, channels connecting the airjet perforations with the fuel space in the bowl the channels opening into such perforations at approximately right angles thereto, a throttle valve toward the induction pipe end of the duct, a control valve toward the intake end of the duct, a Venturi restriction within the duct between the airjet perforations and the control valve, means to connect the control valve to move with the throttle valve but to be adjustable relatively thereto, and an idler jet.

8. An improved carburetor comprising: a chamber having a fuel inlet and a float valve to control the fuel level in the chamber, an air intake duct passing through the chamber, an attachment flange at one end of the duct, airjet perforations through the duct above the fuel level, further perforations through the duct farther from the fuel level than the airjet perforations, the latter perforations having needle valves, channels leading from the fuel space and opening into the airjet perforations through the walls thereof, a throttle valve within the duct near its attachment end, a control valve within the duct near its other end, and a venturi between the airjet perforations and the control valve.

9. Means according to claim 8 characterized by an arm upon a shaft secured to the throttle valve, an arm upon a shaft secured to the control valve, a rod pivoted to the one arm and slidable through a stud upon the other arm, a movable collar positioned upon the rod to bear against the outer side of the stud, and a spring encircling the rod and confined between the stud and a further collar upon the rod intermediate the stud and the pivotal connection of the rod.

10. An improved carburetor comprising, a chamber having a float-controlled fuel inlet, an air-intake duct through the chamber one end of which is adapted to be connected to the induction pipe of an engine, openings through the duct to give communication between the inside of the duct and the space in the chamber above the fuel level, a throttle valve toward the induction pipe end of the duct, a control valve toward the intake end of the duct, means to cause the valves to be operated in unison, the openings through the duct being in two rows and channels which lead from the perforations of the lower row and open into the chamber somewhat below the fuel level.

11. An improved carburetor comprising, a chamber having a float-controlled fuel inlet, an air-intake duct through the chamber one end of which is adapted to be connected to the induction pipe of an engine, openings through the duct to give communication between the inside of the duct and the space in the chamber above the fuel level, a throttle valve toward the induction pipe end of the duct, a control valve toward the intake end of the duct, means to cause the valves to be operated in unison, a rod pivoted to an arm upon the throttle valve, a stud pivoted upon an arm upon the control valve, the rod being slidable through the stud, a movable collar positioned upon the rod on one side of the stud, a spring and a movable collar upon the rod on the other side of the stud, and an arm loosely mounted upon the shaft of the control valve and having a finger adapted to contact with the arm of the control valve.

DANIEL POTTLE KING.